United States Patent [19]
Spahr et al.

[11] Patent Number: 5,645,775
[45] Date of Patent: Jul. 8, 1997

[54] ADAPTIVE CONTROLLER FOR INJECTION MOLDING

[75] Inventors: David K. Spahr, Roscoe; Dennis C. Tibbitts, Rockford, both of Ill.

[73] Assignee: Barber-Colman Company, Loves Park, Ill.

[21] Appl. No.: 539,099

[22] Filed: Oct. 4, 1995

[51] Int. Cl.$^6$ .................................................. B29C 45/77
[52] U.S. Cl. ................... 264/40.5; 264/40.7; 264/328.1; 425/145; 425/146; 364/475.05; 364/475.08
[58] Field of Search ........................... 264/40.1, 40.5, 264/40.7, 328.1; 425/145, 146, 149, 170; 364/475.05, 475.08

[56] References Cited

U.S. PATENT DOCUMENTS

| | | | |
|---|---|---|---|
| 3,797,808 | 3/1974 | Ma et al. | 425/145 |
| 3,859,400 | 1/1975 | Ma | 264/40 |
| 3,904,078 | 9/1975 | Neff et al. | 425/145 |
| 4,060,362 | 11/1977 | Wilson, III | 425/145 |
| 4,146,601 | 3/1979 | Bishop | 264/40.1 |
| 4,695,237 | 9/1987 | Inaba | 425/135 |
| 4,695,632 | 9/1987 | Kalk et al. | 544/194 |
| 4,774,675 | 9/1988 | Kagawa | 364/476 |
| 4,816,197 | 3/1989 | Nunn | 264/40.6 |
| 5,062,785 | 11/1991 | Stroud, III et al. | 425/145 |
| 5,182,716 | 1/1993 | Stroud, III et al. | 364/476 |
| 5,246,645 | 9/1993 | Tagawa et al. | 264/40.1 |

*Primary Examiner*—Jill L. Heitbrink
*Attorney, Agent, or Firm*—Leydig, Voit & Mayer, Ltd.

[57] ABSTRACT

An adaptive controller is provided for controlling the transition, in an injection molding apparatus, from the injection stage to the packing stage. The controller operates by controlling the velocity of the ram during the injection stage, and controlling the ram pressure during the packing stage. The controller anticipates the transition from the injection stage to the packing stage by monitoring the ratio of pressure to velocity. The divergence of this ratio forecasts the onset of the packing stage. At this time, a pressure relief valve is preset in anticipation of the packing stage, to prevent a pressure spike during the transition period. The flow control valve is held constant during the transition.

22 Claims, 6 Drawing Sheets

ADAPTIVE CONTROLLER FOR INJECTION MOLDING

BACKGROUND OF THE INVENTION

1. Field of the Art

The present invention relates to injection molding apparatus controllers, and more particularly, to a controller for controlling the transition between the injection stage and the packing stage of an injection molding apparatus.

2. Discussion of the Related Art

As is well known, injection molding apparatus operate to form a solid, plastic object by injecting molten plastic into a mold cavity, the mold cavity defining the shape of the solid object. The process of creating an injection molded object is broadly defined in four process stages. The first stage is the plastication stage, in which granulated plastic material is introduced and melted within a cylinder. The second stage is the injection stage, in which the molten plastic material is forced from the cylinder into an injection mold that is in fluid communication within the cylinder. Next is the packing stage which begins once the injection mold has filled with molten plastic. During this stage, additional molten plastic is forced into the mold to accommodate shrinkage as the plastic cools in the mold cavity. Finally, the last stage is the holding stage. In this stage, the plastic is maintained at a substantially constant pressure as the plastic solidifies to control plastic properties, such as density and resilience.

To more particularly describe the injection and packing stages of this process, during the injection stage a ram is disposed within the cylinder and is controlled to move within the cylinder to force the molten plastic out of the cylinder and into a mold cavity. The velocity of the ram is closely controlled to control the flow rate of the molten plastic into the mold cavity. Because plastic is flowed to sequentially fill spaces within the mold cavity, the velocity of the ram is preferably controlled in accordance with the interior cavity space being filled. Filling small areas too quickly can result in burning of the plastic, while filling the spaces too slowly may result in voids. It is appreciated that either of these outcomes may result in products that are undesirable and possibly unusable.

When, however, the mold fills and the apparatus enters the packing stage, the velocity of the ram falls to substantially zero. At this time, the process control is switched to pressure control, whereby a substantially constant pressure (of a predetermined value) is maintained on the injection ram. Just as it is important to closely control the ram velocity during the injection stage, it is equally important to control the ram pressure (and therefore the pressure applied to the plastic) during the packing stage. Pressurization during this stage affects the composition of the solidified plastic object, and over or under pressurizing the plastic may result in an undesireable or unusable part.

Numerous types of position sensors are known for detecting the position of the ram during the injection stage. By evaluating the change in ram position over time, the ram velocity may be ascertained. Similarly, pressure sensors are typically located in either or both the mold cavity and the injection cylinder (housing the ram), and these pressure sensors may be utilized to monitor the plastic pressurization during the packing stage.

In the prior art of which applicants are aware, the transition from the injection stage to the packing stage is determined either by monitoring the ram position or the pressure sensors. When the ram position crosses a threshold, it is assumed that the mold is full and pressure control for the packing stage should commence. Likewise, if the pressure detected by the pressure sensors exceeds a given threshold, it is assumed that packing stage control should begin.

The problem with both of these approaches is that an undesireable pressure spike usually occurs at the injection-to-packing stage transition. That is, by the time that the appropriate conditions are sensed and packing stage control is assumed, the plastic has become unduly pressurized. As previously mentioned, such overpressurization can result in undesireable and unusable parts.

Extreme pressure spikes may be somewhat mitigated by altering the predetermined sensing or trigger points. Alternatively, when monitoring pressure sensors, lowering the pressure threshold helps moderate the problem. Often, however, if the pressure overshoot is curtailed it is found that the overall system performance or efficiency has been compromised. It is, therefore, desireable to improve the controller performance in an injection molding apparatus, as the injection molding process transitions between the injection and packing stages.

SUMMARY OF THE INVENTION

Accordingly, it is a primary object of the present invention to provide a controller for an injection molding apparatus having improved control during the transition period from the injection stage to the packing stage.

A more specific object of the present invention is to provide a controller for an injection molding apparatus having a substantially reduced pressure spike at the transition from the injection stage to the packing stage.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a controller for providing a smooth transition from an injection stage to a packing stage in an injection molding apparatus having a ram that moves within a cylinder to force molten plastic contained within the cylinder into an injection mold that is disposed in fluid communication with the cylinder. The controller includes sensors that detecting the fluid pressure of molten plastic injected from the cylinder into the a mold cavity. Sensors are also configured to detect the velocity of the ram moving within the cylinder. Based upon the relationship between ram speed and pressure, as determined from monitoring the sensors, means are provided for anticipating the transition from injection stage to the packing stage. Pressure regulating means regulate the pressure of the molten plastic, and processing means respond to the anticipating means to calculate an approximate control point and preset the pressure regulating means to the approximated control point.

In accordance with the method of the present invention, the transfer condition between an injection stage to a packing stage in an injection molding apparatus is detected. Preferably, the apparatus includes a ram that forces molten plastic from a cylinder into a mold cavity, and the method senses the pressure applied by the ram to the molten plastic. It then determines the velocity of the ram and forms a ratio of the mold pressure to ram velocity. It then monitors this ratio to identify a condition indicative of the transfer between injection and packing stages.

BRIEF DESCRIPTION OF THE DRAWINGS

The accompanying drawings incorporated in and forming a part of the specification, illustrate several aspects of the present invention, and together with the description serves to explain the principles of the invention. In the drawings.

DETAILED DESCRIPTION OF THE PREFERRED EMBODIMENTS

Figure 1:
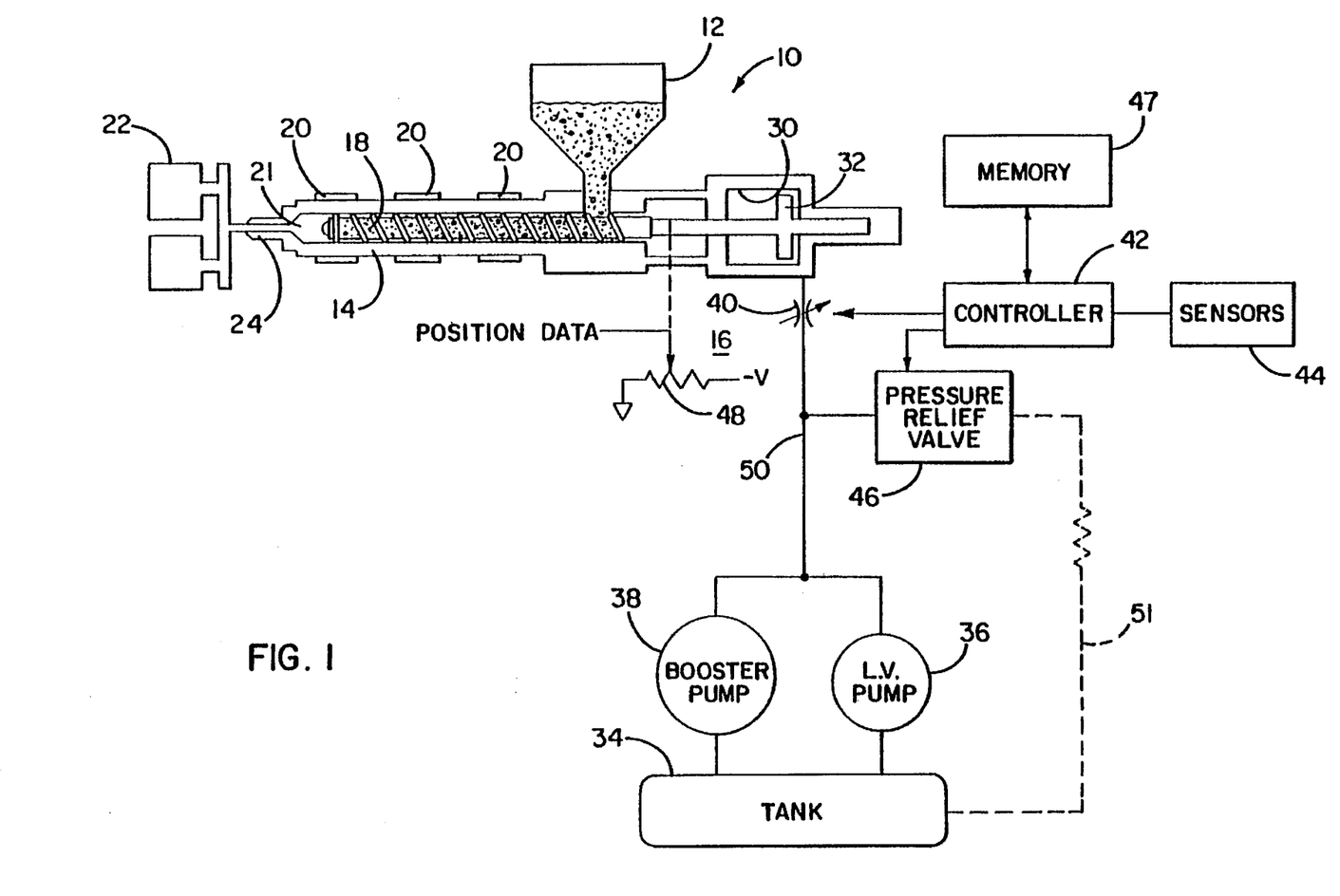
FIG. 1 is diagram illustrating the fundamental components of both an injection molding apparatus and a hydraulic drive system.

Referring now to the drawings, FIG. 1 illustrates a typical injection molding system, which defines the general environment of the present invention. An injection molding apparatus, generally designated by reference numeral 10, broadly includes a hopper 12, a barrel or cylinder 14, and a hydraulic drive system 16. Fine particles of plastic material are loaded into the hopper 12 and fed by gravity from the hopper 12 to the rear portion of the cylinder 14. A plasticating screw 18 is disposed within the cylinder 14 and is rotatably driven to carry the plastic material forward by the augering action of the rotating screw 18. Heater bands 20 are disposed on the outside of the cylinder 14 to heat the cylinder and therefore melt the plastic material. Indeed, as the plastic material moves forward within the cylinder 14, it absorbs heat from the cylinder walls (delivered by the heater bands 20) and from the work energy developed by the screw 18. Cylinder 14 temperatures during this stage typically range from 400 to 500 degrees fahrenheit. In this way, plastic material is melted as it is carried forward, and molten plastic is therefore accumulated at the front end 21 of the cylinder 14.

As molten plastic builds up in this area 21, the screw 18 is forced backward. Once a sufficient amount of plastic material (i.e., shot size) has accumulated in the front end 21 of the cylinder 14, then the apparatus 10 enters the injection stage to force the molten plastic from the cylinder 14 into a mold 22. As previously mentioned, the foregoing stage is known as the plastication stage.

During the injection stage, molten plastic accumulated in the front end 21 of the cylinder 14 is controllably injected into a mold 22 having an internal cavity defining a shape of a plastic object to be moldably created. A nozzle 24 is opened to permit molten plastic to flow from the cylinder 14 into the mold 22. As will be described below, the flow rate of the plastic is controlled by a hydraulic drive system 16, which broadly operates to lineally reciprocate the screw 18 forward within the cylinder 14, thereby forcing molten plastic from the cylinder 14 through the nozzle and into the mold 22. In this regard, the tip of the reciprocating screw 18 is usually equipped with a non-return check valve (not shown) to prevent the molten plastic from slipping back through the screw flights during injection.

It is broadly desired to reciprocate the screw 18 at a relatively high velocity to quickly fill the mold 22. As the mold 22 becomes full, however, the velocity of the screw 18 is greatly reduced and the apparatus 10 enters the packing stage. Having stated this broad objective, it is more specifically desired to vary the relatively high velocity of the reciprocating screw 18 (and thus the flow rate of the molten plastic) during the injection stage in dependence upon the particular shape of the internal cavity of the mold 22, as the spaces within the mold 22 are filled. Accordingly, and as is known, the injection stage is further partitioned into segments, with each segment being defined by a velocity setpoint that, together, define a velocity profile for the injection stage.

Brief mention should be made at this point that both the velocity of the reciprocating screw 18 and the pressure within the mold cavity are important working parameters for the injection molding process. For example, a changed in material viscosity is reflected as a change in ram speed and can be detected by measuring ram position with respect to time. A change in material viscosity also reflects itself as a change in plastic pressure and can be detected by measuring mold cavity pressure with respect to time. Other variations in molding conditions can be detected by monitoring the screw 18 velocity and plastic pressure. Since it is possible to detect variations in molding conditions, it is also feasible to compensate or correct for these variations.

In keeping with the description of FIG. 1, attention will now be directed to the hydraulic system 16 which controls the lineal movement of the screw 18. An injection cylinder 30 is located off the end of the cylinder 14 opposite the mold 22. A ram 32 fixed on the shaft of the screw 18 serves to partition the injection cylinder 30 into forward and rear compartments. A tank 34 containing hydraulic fluid is disposed in fluid communication with the injection cylinder 30. Fluid from the tank 34 is preferably pumped by a low volume pump 36 and booster pump 38 for delivery to the injection cylinder 30. Typically, the booster pump 38 is utilized only during the high velocity injection stage of the injection molding process.

The transfer of hydraulic fluid from the tank 34 to the injection cylinder 30 is controlled by a flow control valve 40 and a pressure relief valve 46, which in turn are controlled by a controller 42. As a general illustration of this control, during the injection stage of the injection molding process, the pressure relief valve 46 is held full-open, and the flow control valve 40 is preferably controlled to control the rate of hydraulic fluid transferred to the injection cylinder 30. The controller 42 will vary the aperture of the flow control valve 40, based on an evaluation of the measured ram velocity in comparison to the desired ram velocity. During the packing stage, it is desired to control the pressure applied to the plastic rather than ram velocity (since ram velocity is substantially zero during the packing stage). This pressure control is achieved by fully opening the flow control valve 40, and controllably varying the pressure relief valve 46. As the pressure in line 50 exceeds the limit established by the pressure relief valve 46, a portion of the hydraulic fluid is channeled via line 51 back to the tank 34. In this way, a constant pressure is maintained in line 50 and therefore in the injection cylinder 30.

It will be appreciated that, in practice, the hydraulic control is more sophisticated than the schematic diagram presented in FIG. 1. Specifically, the lineal velocity of the reciprocating screw 18 is controlled by controlling the flow of hydraulic fluid between the forward and rear compartments of the injection cylinder 30, as divided by the ram 32. Controlling the fluid to apply higher pressure to the rear compartment results in a lineal movement of the screw 18 toward the injection mold 22. Applying a higher pressure in the forward compartment moves the reciprocating screw 18 rearwardly (away from the injection mold 22). During the injection cycle, it will always be desired to move the ram 32 and thus the screw 18 toward the mold 22. Therefore, the rear compartment of the injection cylinder 30 will always be of relatively high pressurization in comparison to the forward compartment.

The above-described ram 32 control is actually achieved through a somewhat more complex valving structure. The valving structure that has been illustrated as the flow control valve 40, in practice, includes valves that circulate fluid from line 50 to either the forward or rear compartment of the injection cylinder 30, and from the opposite compartment back to the tank 34. The specific control of this more complex valve structure, in order to achieve controlled movement of the ram, is known in the art and does not form part of the present invention. Instead, the present invention is directed to the broader aspects of the ram velocity and pressure control. Accordingly, the illustrated valving structure has therefore been simplified to better explain the operation of the present invention.

During the injection stage, when the ram velocity is controlled, the actual ram velocity may be determined by evaluating the change in ram position over time. The ram position, in turn, may be detected by a number of conventional ways, such as position potentiometer 48. This position data is then fed to controller 42 for processing. As shown in FIG. 1, a block denoted as sensors 44 is broadly shown as feeding into the controller 42. The sensors 44 can include position as well as pressure sensors. For example, there are typically pressure sensor associated with the injection cylinder 30 to detect and evaluate the pressure of the hydraulic fluid in both the forward and rear compartments. Likewise, there may be pressure sensors in the cavity of the injection mold 22 to detect the pressure of molten plastic as it is forced into the mold 22. The preferred embodiment of the present invention monitors ram velocity by evaluating ram position sensors.

Furthermore, and consistent with the concepts and teachings of the present invention, a combination of pressure and position sensors may be monitored to ascertain the ram velocity. It is anticipated that more sophisticated systems will use this approach as it will permit varied control for plastics of different viscosities, as previously mentioned.

Figure 2:
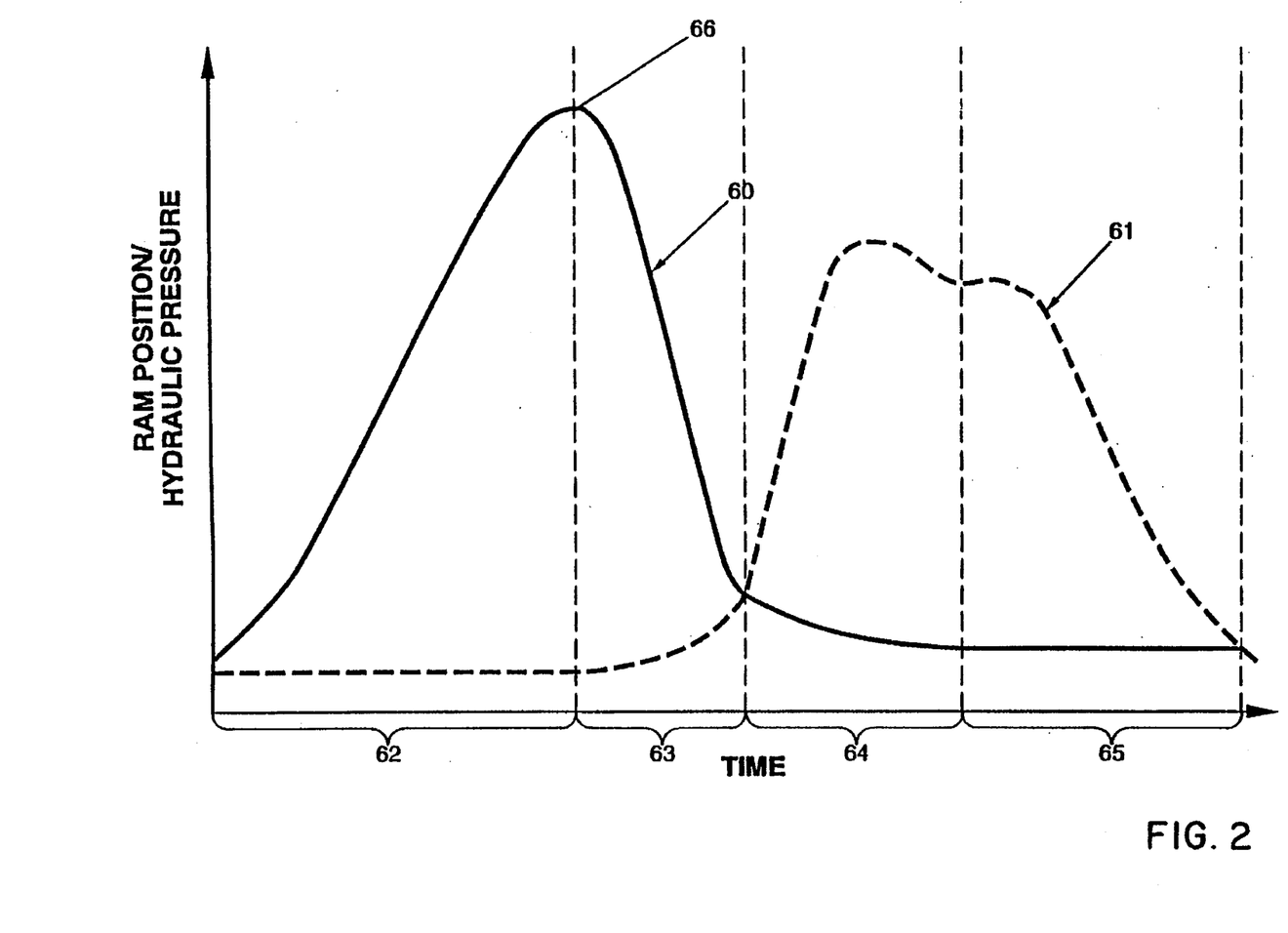
FIG. 2 is a graph illustrating ram position and pressure curves over the four injection molding stages.

Having described the general structure and operation of an injection molding apparatus, reference will now be made to FIG. 2, which shows typical pressure and position curves for a complete injection cycle of an injection molding apparatus. The graph illustrates time along the horizontal axis and ram position/pressure along the vertical axis. Specifically, the ram position vs time plot 60 is illustrated in solid line, while the hydraulic fluid or ram pressure vs time plot 61 is illustrated in dash line.

Looking first at the ram position vs time plot 60, it is seen that at the start of the cycle (i.e., time=zero), the value of the ram position is at a minimum. This indicates that the ram or screw is nearest the injection mold 22 (i.e., the ending position from the previous injection cycle). As previously described, during the plastication stage 62, plastic is fed from the hopper 12 (FIG. 1) into the cylinder 14 and melted, the screw 18 and therefore ram 32 begins to back away from the mold 22. Once the ram 32 reaches a particular peak position 66, indicating that sufficient plastic has been melted to fill the mold 22 (i.e., shot size), then the system enters the injection stage 63. In this stage, the ram 32 is rapidly forced forward to inject the molten plastic into the mold 22. As the ram 32 nears its starting position, the system enters the pack stage 64. Finally, the ram 32 reaches the end of its stroke and is maintained in that position throughout the hold stage 65.

The ram pressure plot 61 is also illustrated for the four stages of an injection molding cycle. During the plastication stage 62, before the cylinder 14 has filled with plastic, the ram or plastic pressure is a minimum. The pressure, however, increases through the injection cycle 63. Near the end of the injection stage, as the mold 22 becomes substantially filled with molten plastic, the ram pressure begins to rise substantially, reaching a maximum during the packing stage. Thereafter, during the holding stage 65 the ram pressure trails off to once again reach its minimum value.

As previously described, each of the four stages (or at least the injection, packing, and holding stages) are further segmented for control purposes. During the injection stage 62 the ram 32 velocity (i.e., change in position over time) may be closely controlled. During the packing 63 and holding 64 stages, the hydraulic fluid pressure (driving the ram) is closely controlled. And this control is achieved by defining particular target values or setpoints for the ram 32 velocity or pressure during the specific segments within a given stage. It is understood that the hydraulic pressure is related to the mold pressure, and thus controlling the hydraulic pressure, in turn, controls the mold pressure (while the plastic is in its molten state).

Figure 3A:
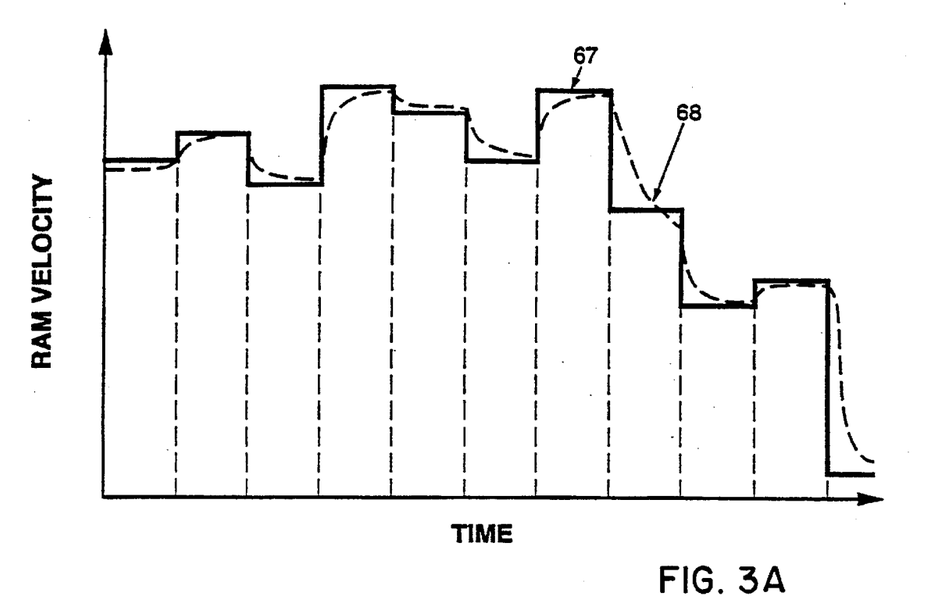
FIG. 3A is a graph illustrating a hypothetical velocity curve (in dashed line) overlaid with a segmented velocity curve defined by setpoints (in solid line) for an injection stage of an injection molding cycle.

To more clearly illustrate this point, reference is made to FIG. 3A, which shows a curve of ram velocity vs time in a hypothetical injection stage 63. Segments are illustrated by the dashed vertical lines, and target curve 67 or setpoints are illustrated by the solid line. The segments have been illustrate as being of equal width, and thus equal time duration. It is appreciated that, consistent with the concepts and teachings of the present invention, the segments may be of differing time durations, depending upon the particular size and shape of the mold cavity. It is further understood that the packing and holding stages are similarly partitioned into segments. During these stages, however, the ram pressure, rather than velocity, is targeted and controlled.

Figure 3B:
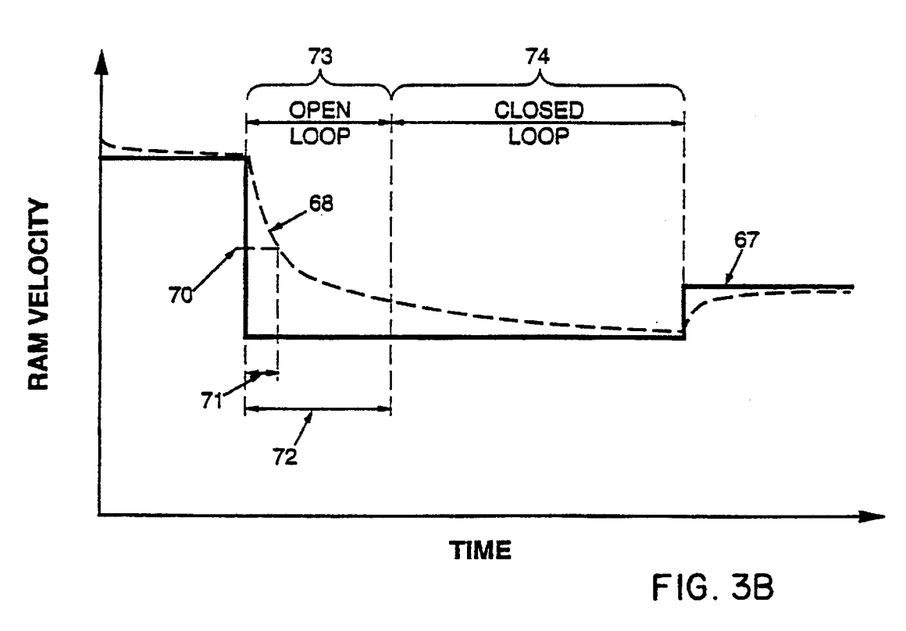
FIG. 3B is a graph illustrating segmented velocity curves (in dashed line) overlaid with actual velocity curves (in solid line) for a portion of an injection stage.

Also shown in dashed line is a hypothetical measured velocity curve 68. As illustrated, this curve generally tracks the targeted curve 67, but is characterized by a delay or lag. FIG. 3B better illustrates this lag, and shows an expanded portion of the curves 67 and 68. During the early portion of a given segment, the control of the ram 32 velocity is governed by an open-loop control equation. In contrast, the later portion of a given segment, the ram 32 velocity is governed by a closed-loop control equation. The particular control equations will be described below, in connection with FIG. 5.

To more particularly describe the ram 32 control, at the beginning of a given segment the target value or setpoint for that segment is retrieved from memory and the ram 32 is controlled (open-loop) to approach that value. This results in a steep progression of curve 68 toward the new segment setpoint value. It has been learned through experience that the actual path of curve 68 (i.e., response of the ram 32) will substantially follow an exponential curve. Assuming that the actual response will behave substantially exponentially, the open-loop control time is approximated as four times the time required to achieve one-half the targeted value.

The full segment illustrated in FIG. 3B shows a setpoint value much lower that the previous segment's setpoint value, and thus a steep downward progression of the actual ram velocity curve 68. When the new setpoint is retrieved from memory, it is compared to the previous setpoint and the midway point 70 is calculated. When the actual velocity curve 68 reaches this midway value 70 the time duration 71 required to reach that point is noted. This represents one-fourth of the time 72 required for the open-loop 73 control mode. Thereafter, the remaining portion of the segment is controlled pursuant to closed loop control 74. It should be appreciated that, consistent with the present invention, other means for determining and apportioning the open-loop/ closed-loop timing could be employed.

While the time value 72 may be calculated anew for each segment, it has been found that the time 72 is substantially the same from segment to segment. Therefore, consistent with the invention, it could be calculated a single time, and thereafter utilizes the once-calculated time in switching from open-loop to closed loop control. In the preferred embodiment, a running average is maintained for this time, and this average is stored in a memory location and updated after each additional segment for a particular mold cycle.

Figure 4:
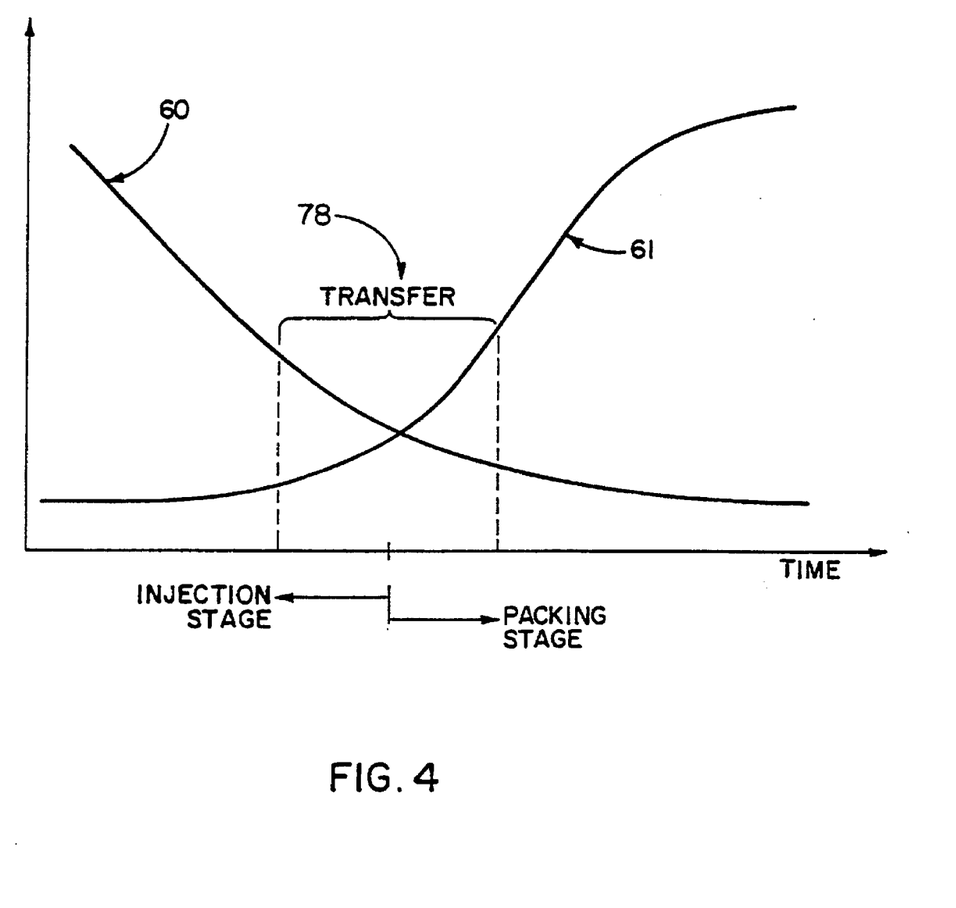
FIG. 4 is a graph illustrating ram position and pressure curves during the transition period between injection and packing stages.

The present invention is focused on the transition period 78 between the injection stage 63 and the packing stage 64. FIG. 4 illustrates this period. Specifically, the transition period 78 begins during the last segment of the injection stage 63, and overlaps into the first segment of the packing stage 64. In short, the present invention operates to anticipate the beginning of the packing stage, and then preset the pressure relief valve 46 to the value that it will operate at, when the packing stage 64 begins.

More particularly, since the transition period 78 overlaps the injection stage 63 and the packing stage 64, an object of the present invention is to anticipate or forecast the beginning of the packing stage 64. There are several ways in which this could be done, and the present invention is not limited to any particular way. For example, the controller 42 may approximate the onset of the packing stage 64 by measuring a predetermined time period after the beginning of the injection stage 63. Alternatively, the controller 42 may be configured to monitor either the pressure sensors or ram position sensor 48. Detecting a predetermined rise in ram pressure or a predetermined drop in ram velocity will indicate the onset of the packing stage.

Preferably, the present invention monitors the ratio of ram pressure to ram velocity. Since both of these value change (pressure increases and velocity decreases) at the end of the injection cycle, it has been found that monitoring the ratio of these values provides an accurate indicia of the approaching end of the injection stage 63. That is, the divergence of these values accurately forecasts the onset of the packing stage 64, and thus when this ratio exceeds a predetermined threshold the transition phase is entered.

Having detected and entered the transition period 78, the present invention then operates to minimize the pressure spike typically associated with this transition. To better understand the operation of the present invention during this period, reference is made to FIG. 5, which shows a block diagram illustrating the control before, after, and during the transition period. As previously mentioned, the injections stage 63 is controlled by retrieving a profile of setpoints stored in memory 47 and controlling the flow control valve 40 in accordance with this profile. Similarly, the packing stage 64 is controlled by retrieving a profile of setpoints stored in memory 47 and controlling the pressure relief valve 46 in accordance with this profile.

Figure 5:
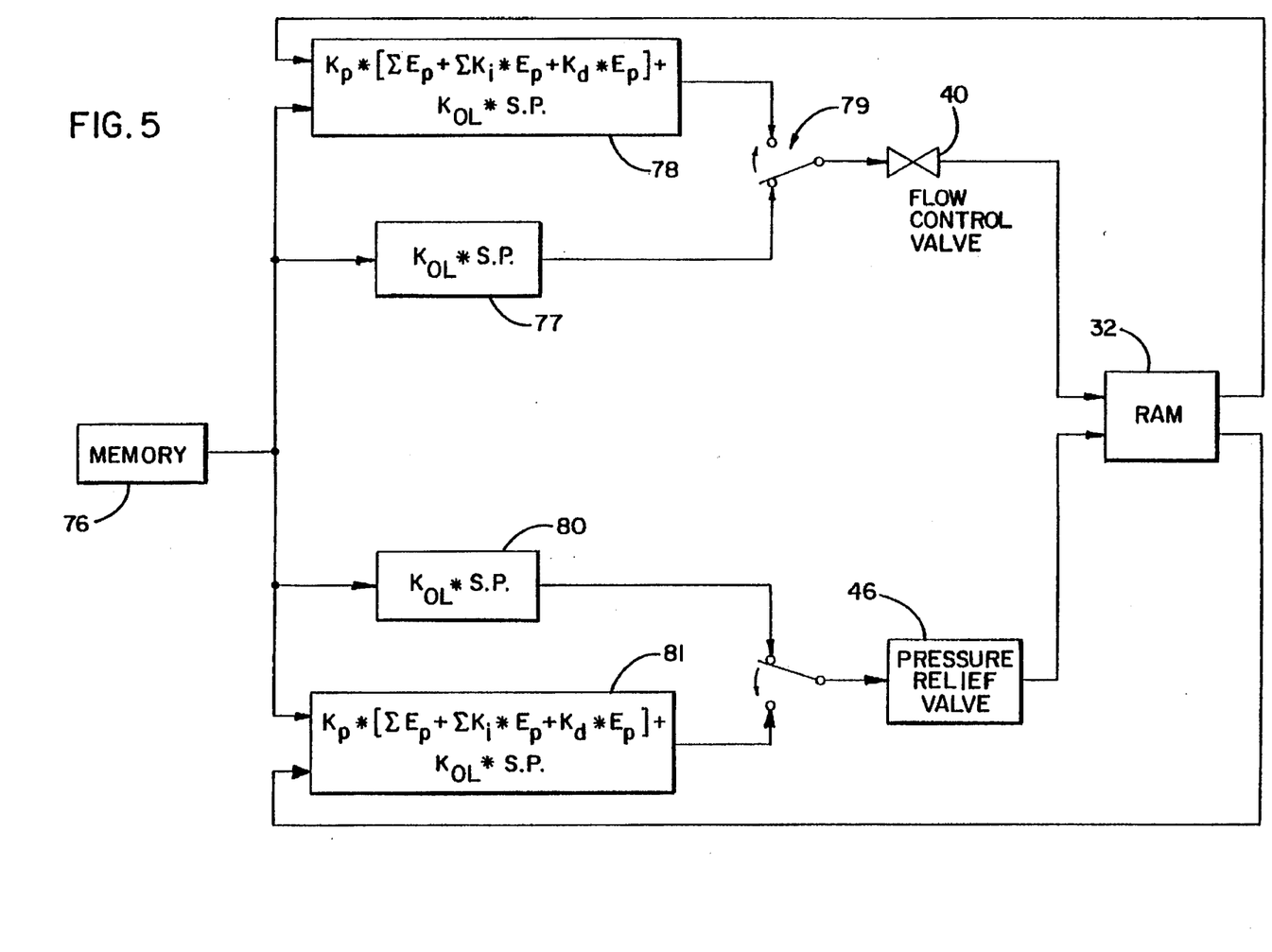
FIG. 5 is a block diagram depicting a conceptual organization of the software flow in connection with the controlled hardware components.

As the system nears the end of the injection stage 63, where the velocity of the ram 32 begins to slow, the flow control valve 40 then tends to open, to try and maintain the velocity of the ram 32. During the transition period 75, the present invention holds the flow control valve 40 in its present state and presets the pressure relief valve 46 to an initial pressure setting. Maintaining the flow control valve 40 helps restrain the pressure spike that otherwise occurs at the transition. Furthermore, presetting the pressure relief valve 46 limits the pressure within hydraulic line 50. Since it requires a definite period of time (i.e., response time) to configure these mechanical devices, effectively anticipating the onset of the packing stage 64 to provide the appropriate response time is important.

Turning now to the more specific aspects of the control during the injection stage 63, a profile of setpoints are stored in memory 76. And these setpoints are utilized to define a target velocity curve (during the injection stage) for the ram 32. Indeed, the setpoints are utilized to set the aperture of a flow control valve 40, which controls the flow of hydraulic fluid in the forward and rear chambers of the injection cylinder 30 (See FIG. 1). During the initial portion of a given segment the flow control valve 40 is controlled according to an open-loop control equation 77, and during the latter segment portion a closed-loop control equation 78 governs the valve 40 control. Preferably, the open-loop control equation 77 is:

$$\text{Output} = K_{OL} * \text{Setpoint},$$

and the closed-loop control equation 78 is:

$$\text{Output} = K_p * [\Sigma E_p + \Sigma K_i * E_p + K_d * E_p] + K_{OL} * \text{Setpoint}.$$

In the foregoing equations:

$K_{OL}$=controller output/actual ram velocity
$E_p$=Setpoint−actual ram velocity
$K_d$=0
$K_p$=0.5*$K_{OL}$
$K_i$=1/(0.5*$K_p$*steptime), where the steptime is preferably one-half the open-loop time. Each of the foregoing control parameters is calculated at the end of the segment, and is stored in memory for use in the corresponding segment of the next cycle (i.e., same segment for the next part). The $K_{OL}$ term is also referred to as the open-loop gain coefficient, and operates to adjust the open-loop gain, for a particular segment, from cycle to cycle. Thus, this gain coefficient value is adjusted to minimize the deviation between the target ram velocity (as reflected in the controller output) and the actual ram velocity. The $E_p$ term is an error term, representing the deviation between the setpoint and the actual ram velocity. The $K_p$, $K_i$, and $K_d$ terms are controller coefficients for proportional, integral, and derivative controller terms. In the close-loop output equation, the summation symbols represent the summation of the indicated controller terms for the segments of a given mold cycle, and are reset from cycle to cycle. As is appreciated from the foregoing equations, the target values or setpoints are never altered, but remain fixed from mold cycle to mold cycle. Nevertheless, the molding apparatus provides extremely flexible and adaptive control from cycle to cycle, by virtue of its ability to update the control parameters.

There are generally two modes of operation of the controller 42: an operator controlled mode, and an automatically-tuned mode. The above-listed equations depict the automatically-tuned mode. In this mode the controller is preprogrammed with certain default values for the control parameters, and it automatically tunes or adjusts these parameters over the course of several injection cycles. In this mode $K_d$ is set to zero, so that differential term drops out of the equation. Alternatively, the various control parameters (with the exception of the $K_{OL}$ term, may be set by an operator and remain fixed through the injection cycle. This is known as the operator controlled mode.

It is further appreciated that FIG. 5 has been presented merely for purposes of illustration and conceptualizing the preferred control. That is, a switch 79 has been illustrated as switching the flow valve 40 and thus ram 32 from open-loop to closed-loop control. Feedback from the ram 32 is illustrated as only being fed back to the closed-loop control block 78. And the memory block 76, containing the profile setpoints, is shown as providing the inputs to both the open-loop 77 and closed-loop 78 control blocks. In practice, the entirety of blocks 76–78 and switch 79 are performed by software and computer control. In this regard, reference is made to concurrently filed, copending application Ser. No. 08/539,098, filed on Oct. 4, 1995, herein incorporated by reference, for a more detailed description of the particular control during the injection stage 63.

Also shown in FIG. 5 is are control blocks 80 and 81, which represent the open-loop and closed-loop control of the pressure relief valve. These control blocks 80 and 81 are active during the packing stage 64 and holding stage 65. It is noted that the equations are the same as the equations used in connection with the flow valve 40 control during the injection stage 63. With the exception that control blocks 80 and 81 operate to control the pressure relief valve 46, instead of the flow control valve, the operation of the two sets of control blocks is the same (recognizing that the $K_{OL}$ and $E_d$ terms of blocks 80 and 81 reflect pressure coefficients of pressure control, rather than flow control). Accordingly, a separate description of the pressure control is not required and will not be presented. It is noted, however, that the feedback from the ram 32 to block 78 is ram velocity feedback, while the feedback from the ram 32 to block 81 is ram pressure feedback.

During the transition period 75, from the injection stage 63 to the packing stage 64, the controller 42 (FIG. 1) is operative to hold the flow control valve 40 in its present state, by freezing the value of the signal driving the flow control valve 40. The pressure relief valve 46 is then preset to a value, for which it is anticipated to operate at the commencement of the packing stage 64. In this regard, an anticipated setpoint is read from memory 76 and the pressure relief valve 46 is controlled pursuant to a similar open-loop control equation to preset the pressure relief valve 46 to this anticipated value. This anticipated value is updated from cycle to cycle, based on an evaluation of the actual pressure relief valve 46 setting at the beginning of the packing stage 64.

Figure 6:
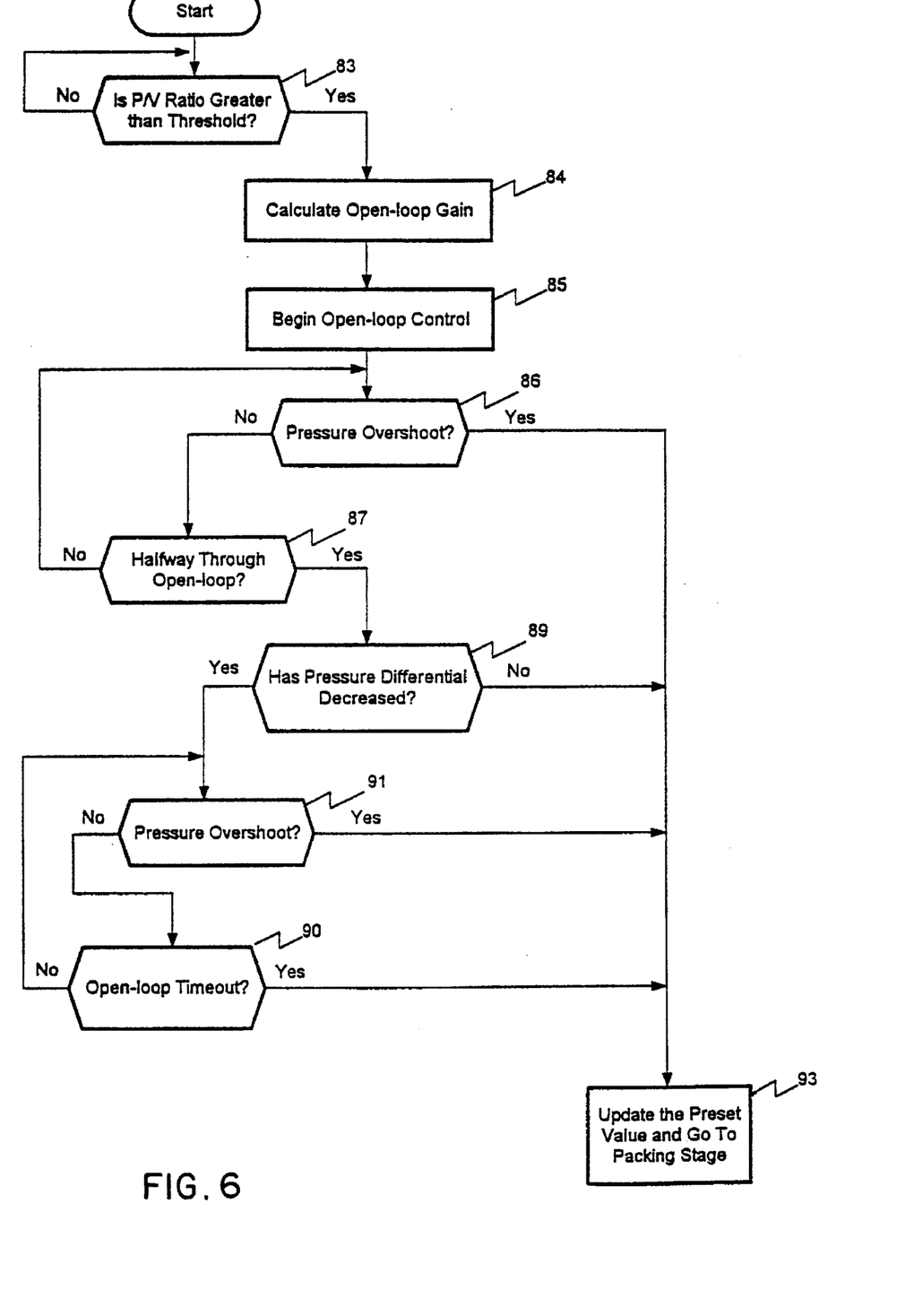
FIG. 6 is a software flowchart that depicts top-level controller operation.

In this regard, reference is made to FIG. 6, which shows a top-level software flowchart of the operation of the present invention during the transition period 75. During the injection stage 63, a ratio of ram pressure to velocity is monitored at step 83. Once this ratio exceeds a predetermined threshold, the controller then calculates the open-loop time or transition period (step 84), during which it will control the pressure relief valve 46 according to the open-loop control equation during the transition period (i.e., output=$K_{OL}$* first packing stage setpoint). This open-loop time is set in one of two ways. First, it may be set by the operator as a fixed value. Alternatively, it may be set based upon the gain coefficients of the PID controller. More specifically, the open-loop or transition time may be calculated as:

$$\text{transition time}=4/(K_i*K_p)$$

Open-loop control is commenced at step 85.

During the open-loop control period, the ram pressure is monitored to ensure the pressure does not overshoot the targeted pressure (step 86). If it does, the controller will switch to the packing stage (step 93). Otherwise, open-loop control will evaluate the ram pressure midway through the open-loop control (step 87), to ensure that the pressure differential has decreased. That is, to ensure that the controller 42 is driving the pressure relief valve 46 is the right direction. If the pressure differential has not decreased, then the controller 42 will shift to the packing stage (step 93).

If, however, the pressure differential has decreased, the controller 42 will generally continue open-loop control until the open-loop control or transition period times out (step 90). Again, if there is a pressure overshoot, the controller will switch (before the open-loop timeout) to packing stage control (step 91). At the end of the transition period (step 90), the controller will update the anticipated, preset control value for use in the next transition cycle and go to the packing stage 64 control routine (step 93).

The foregoing description of various preferred embodiments of the invention has been presented for purposes of illustration and description. It is not intended to be exhaustive or to limit the invention to the precise forms disclosed. Obvious modifications or variations are possible in light of the above teachings. For example, while the preferred embodiment of the present invention has been described in connection with an injection molding controller 42 directed to alternatively control a flow control valve 40 and a pressure relief valve 46, the broad control concepts of the present invention applies equally to single valve systems. That is, some injection molding systems are entirely controlled (through all stages) by a single flow control valve 40 or a single pressure relief valve. And the present invention is applicable to these systems as well. Other systems are known that utilize multiple flow and pressure relief valves, and the present invention is applicable to these systems as well.

The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for providing a smooth transition between an injection stage to a packing stage in an injection molding apparatus comprising the steps of:

anticipating the transition from the injection stage to the packing stage;

calculating an approximate control point for operating a pressure relief valve;

presetting the pressure relief valve according to an open-loop control equation to adjust the pressure relief valve to the control point;

establishing a time limit for operating the pressure relief valve during the open-loop control period; and controlling the pressure relief valve according to a closed-loop control equation after the time limit has expired.

2. The method according to claim 1, further including the step of monitoring the actual pressurization of the molten plastic and prematurely switching from open-loop to closed-loop control if the actual pressurization exceeds a threshold value.

3. A method for detecting the transfer condition between an injection stage to a packing stage in an injection molding apparatus having a ram that forces molten plastic from a cylinder into a mold cavity, the method comprising the steps of:

sensing the pressure applied by the ram to the molten plastic;

determining the velocity of the ram;

forming a ratio of pressure and velocity; and monitoring the formed ratio to a ratio that exceeds a predetermined threshold value.

4. The method according to claim 3, further including the step of recognizing the transfer condition when the ratio exceeds a predetermined magnitude.

5. The method according to claim 3, further including the step of recognizing the transfer condition when the rate of change of the ration exceeds a predetermined ratio.

6. A controller for providing a smooth transition from an injection stage to a packing stage in an injection molding apparatus having a ram that moves within a cylinder to force molten plastic contained within the cylinder into an injection mold having a mold cavity that is disposed in fluid communication with the cylinder, the controller comprising:

sensor means for detecting both the fluid pressure of molten plastic injected from the cylinder into the mold cavity and the velocity of the ram moving within the cylinder;

detection means responsive to the sensor means for calculating and monitoring the ratio of the plastic pressure over the ram velocity, the detection means operative to detect the transition from the injection stage to the packing stage when the ratio exceeds a predetermined value;

a pressure relief valve disposed in fluid communication with the cylinder housing the ram; and pressure regulating means responsive to the detection means for regulating the pressure of the molten plastic during the final portion of the injection stage, the pressure regulating means operative to calculate an approximate control point and a preset the pressure relief valve.

7. A controller for providing a smooth transition from an injection stage to a packing stage in an injection molding apparatus having a ram that moves within a cylinder to force molten plastic contained within the cylinder into an injection mold having a mold cavity that is disposed in fluid communication with the cylinder, the controller comprising:

sensor means for detecting the fluid pressure of molten plastic injected from the cylinder into the mold cavity, the sensor means also configured to detect the velocity of the ram moving within the cylinder;

anticipating means responsive to the sensor means for anticipating the transition from injection stage to the packing stage;

pressure regulating means for regulating the pressure of the molten plastic during the final portion of the injection stage; and processing means responsive to the anticipating means for calculating an approximate control point for establishing a threshold pressure for the molten plastic, and presetting the pressure regulating means to the approximated control point according to an open-loop control equation.

8. The controller according to claim 7, wherein the anticipating means is operative to calculate a ratio of the plastic pressure over the ram velocity, the anticipating means further operative to detect the transition from the injection stage to the packing stage when the ratio exceeds a predetermined value.

9. The controller according to claim 7, wherein the anticipating means is operative to monitor the position of the ram, the anticipating means further operative to detect the transition from the injection stage to the packing stage when the ram position reaches a predetermined position.

10. The controller according to claim 7, wherein the anticipating means is operative to monitor the pressure of hydraulic fluid driving the ram, the anticipating means further operative to detect the transition from the injection stage to the packing stage when the hydraulic fluid pressure reaches a predetermined threshold.

11. The controller according to claim 7, wherein the anticipating means is operative to monitor a ratio of mold cavity pressure over the ram velocity, the anticipating means further operative to detect the transition from the injection stage to the packing stage when the ratio exceeds a predetermined value.

12. The controller according to claim 7, wherein the anticipating means is operative to monitor the elapsed time during the injection stage, the anticipating means further operative to detect the transition from the injection stage to the packing stage when the elapsed time reaches a predetermined value.

13. The controller according to claim 7, further including a timing means operative to establish a time limit.

14. The controller according to claim 13, wherein the processing means is responsive to the time limit to terminate the control of the pressure regulating means according to the open-loop control equation and to commence control of the pressure regulating means according to a closed-loop control equation.

15. The controller according to claim 7, further including an overshoot detection means responsive to the sensor means, the overshoot detection means operative to detect a pressurization of the molten plastic that exceeds the threshold pressure.

16. The controller according to claim 15, wherein the processing means is responsive to the overshoot detection means to terminate the control of the pressure regulating means according to the open-loop control equation and to commence control of the pressure regulating means according to a closed-loop control equation.

17. The controller according to claim 7, further including a modification means responsive to the sensor means for modifying a control parameter of the open-loop control equation for use in subsequent injection cycles.

18. The controller according to claim 17, wherein the modification means is operative to compare the actual pressure of the molten plastic with the desired pressure and update the control parameter based on the comparison.

19. A controller for providing a smooth transition from an injection stage to a packing stage in an injection molding apparatus having a hydraulic drive system including a flow control valve for regulating the flow rate of hydraulic fluid to an injection cylinder and a pressure relief valve that regulates the maximum pressure of the hydraulic pressure flowed to the injection cylinder, the controller comprising:

an injection stage control means operative to control an aperture of the flow control valve to regulate the flow rate of hydraulic fluid therethrough, and maintain the pressure relief valve at its maximum pressure value;

a packing stage control means operative to control a pressure relief point of the pressure relief valve to regulate the pressurization of the hydraulic fluid flowed to the injection cylinder, and maintain the flow control valve at its maximum aperture;

detection means for detecting the transition from the injection stage to the packing stage; and control means responsive to the detection means for holding the flow control valve in its current state and actively controlling the pressure relief valve during the transition from the injection stage to the packing stage.

20. The controller according to claim 19, further including means to anticipate a control point for operating the pressure relief valve at the commencement of the packing stage.

21. The controller according to claim 20, wherein the control means is operative to preset the pressure relief valve to the control point.

22. The controller according to claim 19, further including means responsive to the detection means for freezing the state of the flow control valve upon detection of the transition from the injection stage to the packing stage.

* * * * *